United States Patent [19]

Wirth et al.

[11] Patent Number: 5,099,701
[45] Date of Patent: Mar. 31, 1992

[54] BALANCE AND DYNAMOMETER WITH ELASTIC REDUCTION

[75] Inventors: Johannes Wirth; Max Knüsli, both of Zurich, Switzerland

[73] Assignee: Wirth Gallo Messtechnik AG, Zurich, Switzerland

[21] Appl. No.: 459,795

[22] PCT Filed: Jun. 20, 1989

[86] PCT No.: PCT/CH89/00115

§ 371 Date: Feb. 20, 1990

§ 102(e) Date: Feb. 20, 1990

[87] PCT Pub. No.: WO90/01148

PCT Pub. Date: Feb. 8, 1990

[30] Foreign Application Priority Data

Jul. 18, 1988 [CH] Switzerland .................. 02759/88

[51] Int. Cl.⁵ .................................. G01L 1/10
[52] U.S. Cl. .................... 73/862.59; 73/DIG. 1
[58] Field of Search ........ 73/862.59, 862.64, 517 AV, 73/704, DIG. 1; 177/210 FP

[56] References Cited

U.S. PATENT DOCUMENTS 3,470,400  9/1969  Weisbord .................. 73/862.59 X
3,969,934  7/1976  Raskin ..................... 73/862.64 X
4,406,966  9/1983  Paros ...................... 73/862.59 X
4,658,174  4/1987  Albert ..................... 73/517 AV X

FOREIGN PATENT DOCUMENTS 0025807  4/1981  European Pat. Off. .
0071652  2/1983  European Pat. Off. .
8633612  3/1987  Fed. Rep. of Germany .
2176800  11/1973  France .

Primary Examiner—Charles A. Ruehl
Attorney, Agent, or Firm—Johnson & Gibbs

[57] ABSTRACT

A balance and an elastic, force reducing dynamometer. The dynamometer, is of the type having a plurality of plate springs and a laterally oscillating wire clamped between a pair of wire clamping heads which are shifted under load only in a direction parallel to the clamping heads. This result is achieved by mounting the wire clamping heads in approximately the center of the corresponding one of two plate springs with a pair of struts. In alternate embodiments of the invention, both struts which mount a clamping head may be straight, one strut may be straight and the other strut offset, or both struts may be offset. The elasticity of the struts and the ratios are variable and adjustable within wide limits.

12 Claims, 3 Drawing Sheets

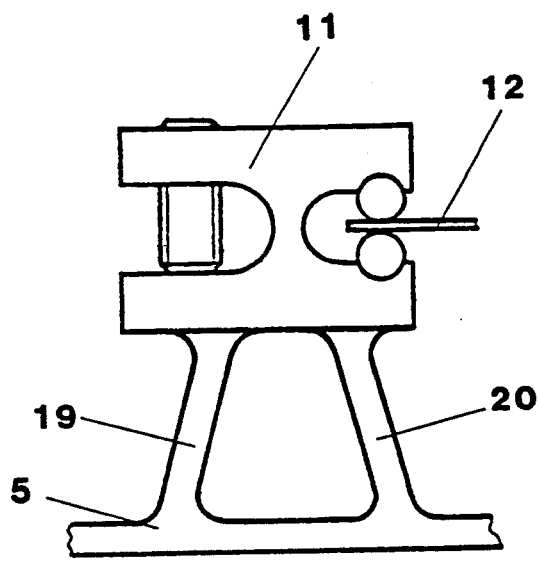
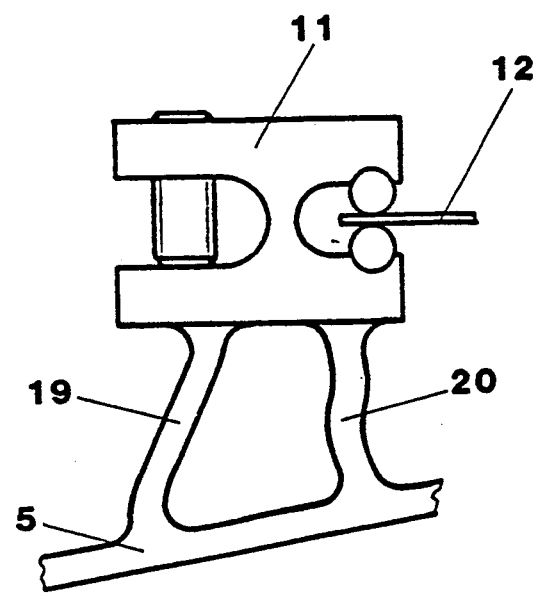
FIG. 5A          FIG. 5B
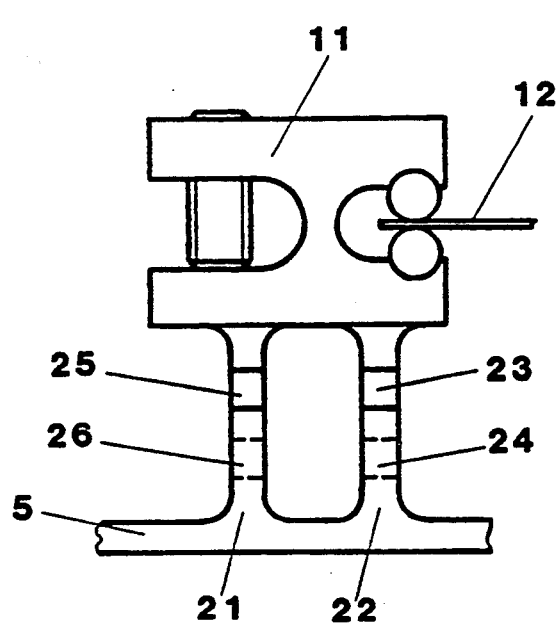
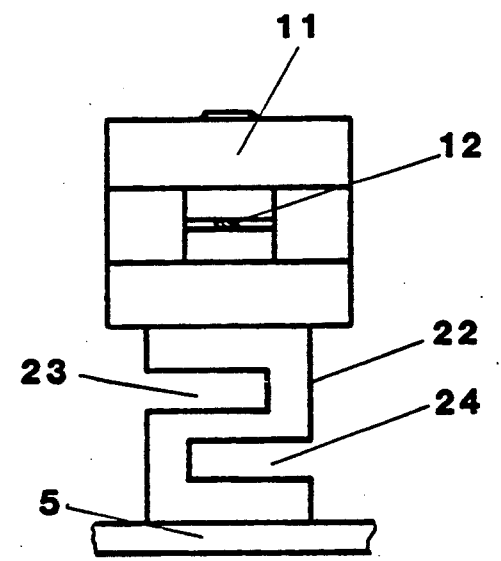
FIG. 6A          FIG. 6B

BALANCE AND DYNAMOMETER WITH ELASTIC REDUCTION

FIELD OF THE INVENTION

This invention relates to a balance and dynamometer. More particularly, this invention relates to a dynamometer having a pair of parallel struts for elastically reducing the input force exerted thereon.

BACKGROUND OF THE INVENTION

A balance and dynamometer may be seen by reference to West German Patent Publication DE Gbm. G 86 33 612.6. In the dynamometer disclosed therein, an elastic parallel guide for reducing the input force being measured is formed from two thicker deflecting springs and two thinner deflecting springs. A single strut is positioned approximately in the center of each of the thinner deflecting springs. Each strut, in turn, supports a wire clamping head thereon. A laterally oscillating wire is clamped between the wire clamping heads. The thicker deflecting springs, thinner deflecting springs, struts and wire clamping heads are fabricated from a single piece of material.

The disadvantage to the dynamometer configuration disclosed in DE Gbm G 86 33 612.6 is each strut which supports a wire clamping head experiences a flexural stress. As a result of this flexural stress, each wire clamping head which is supported by a single strut carries out a pitching motion when an input force to be measured by the dynamometer is introduced. In this manner, each end region of the laterally oscillating wire experiences a flexural stress. The flexural stress may also introduce error into any prior determination of the length of the laterally oscillating wire by causing the upper and lower edges of the laterally oscillating wire to no longer be located exactly above one another.

It is an object of this invention to provide a dynamometer having strut support means which support a wire clamping head thereon such that the aformentioned disadvantages are prevented and the wire clamping heads thereby supported are allowed to shift only in a direction parallel to the head.

SUMMARY OF THE INVENTION

In one aspect, the present invention is of a balance and an elastic, force reducing dynamometer. The dynamometer includes a frame, a central block portion, a first pair of plate springs and a second pair of plate springs. First and second wire clamps are mounted in approximately the center of the first and second plate springs, respectively, which comprise the second pair of plate springs and a laterally osicllating wire is clamped therebetween. A pair of struts are used to mount each of the first and second wire clamps on the first and second plate springs, respectively.

In another aspect, the present invention is of a balance and an elastic, force reducing dynamometer where first, second, third and fourth struts are mounted on the frame of the dynamometer. A first clamping means mounted on the first and second struts clamps one end of a laterally oscillating wire and a second clamping means mounted on the third and fourth struts clamps the other end of the laterally oscillating wire. In alternate embodiments of this aspect of the invention, each of the first, second, third and fourth struts further comprise a straight strut, each of the first and third struts further comprise a straight strut and each of the second and fourth struts further comprise an offset strut, or each of the first, second, third and fourth strust further comprise an offset strut.

BRIEF DESCRIPTION OF THE DRAWINGS

The invention may be better understood, and its numerous features and advantates will be apparent to those skilled in the art, by reference to the accompanying drawings in which:

FIG. 5a is a fragmentary side view of a fourth embodiment of the dynamometer constructed in accordance with the teachings of the present invention;

FIG. 5b illustrates the dynamometer of FIG. 5a under load;

FIG. 6a is a fragmentary side view of a fifth embodiment of the dynamometer constructed in accordance with the teachings of the present invention; and FIG. 6b is a front view of the dynamometer of FIG. 6a.

DETAILED DESCRIPTION OF THE INVENTION

Figure 1:
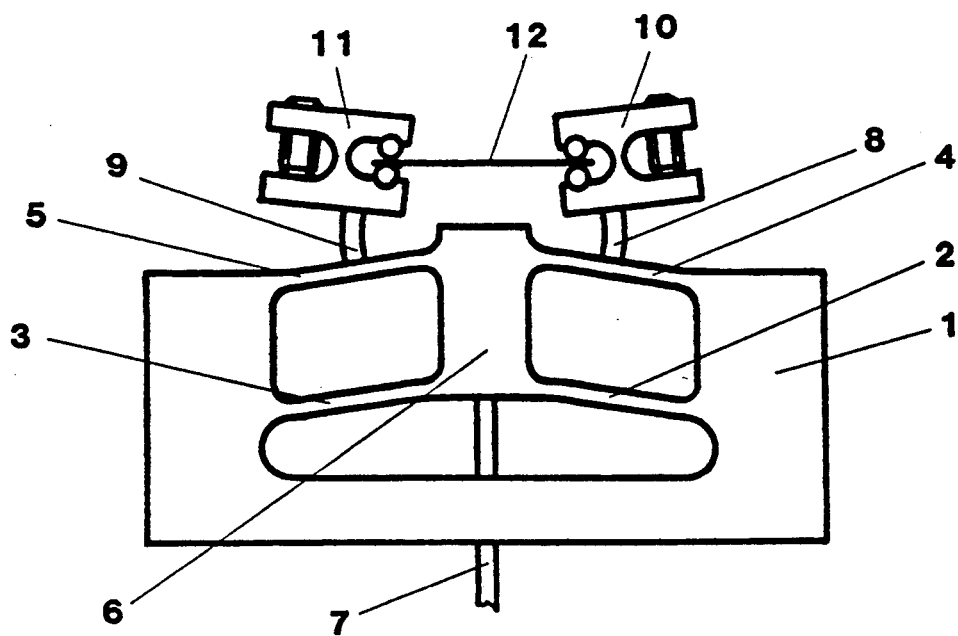
FIG. 1 is a side view of a prior dynamometer under load.

Referring first of FIG. 1, a dynamometer known in the art may now be seen. The dynamometer includes a frame, a pair of thicker plate springs 2, 3 of a first rigidity and a pair of thinner plate springs 4, 5 of a second rigidity different from the first rigidity. Each thicker plate spring 2, 3 and thinner plate spring 4, 5 is mounted on frame 1. In most instances, the dynamometer is screwed tight to a balance platform (not shown). Each of the thicker plate springs 2, 3, as well as each of the thinner plate springs 4, 5, are attached to a central block 6. A post 7 is connected to central block 6. Thus, a force applied to post 7 is transmitted through central block 6 to the dynamometer where the magnitude of the force may be measured.

A single strut 8, 9, is positioned in approximately the center of each thinner plate spring 4, 5, respectively. A first wire clamping head 10 is mounted on strut 8 and a second wire clamping head 11 is similarly mounted on strut 9. Frame 1, thicker plate springs 2, 3, thinner plate springs 4, 5, central block 6, post 7, struts 8, 9 and clamping heads 10, 11 are fabricated from a single piece of material. If desired, the differing rigidities of thicker plate springs 2, 3 and thinner plate springs 4, 5 may be produced by varying their respective lengths, material or by designing their flexural couplings differently.

A laterally oscillating wire 12 is clamped between wire clamping heads 10 and 11. Typically, the laterally oscillating wire includes excitation apparatus of conventional design. The excitation apparatus is, however, omitted from the drawings so that the present invention may be more clearly seen. As may be seen in FIG. 4, when a force stresses laterally oscillating wire 12, struts 8, 9 bend under the influence of laterally oscillating wire 12, thereby causing each wire clamping head 10, 11 to begin to pitch. If, on the other hand, the elasticity of the laterally oscillating wire 12 is greater than the elasticity of struts 8, 9, wire clamping heads 10, 11 will still begin to pitch, but in the other direction. It should be clearly noted, however, that the deformation of struts 8, 9 illustrated in FIG. 1, as well as the deformation of the struts in the drawings to follow, has been exaggerated for illustrative purposes only.

Figures 2A, 2B:
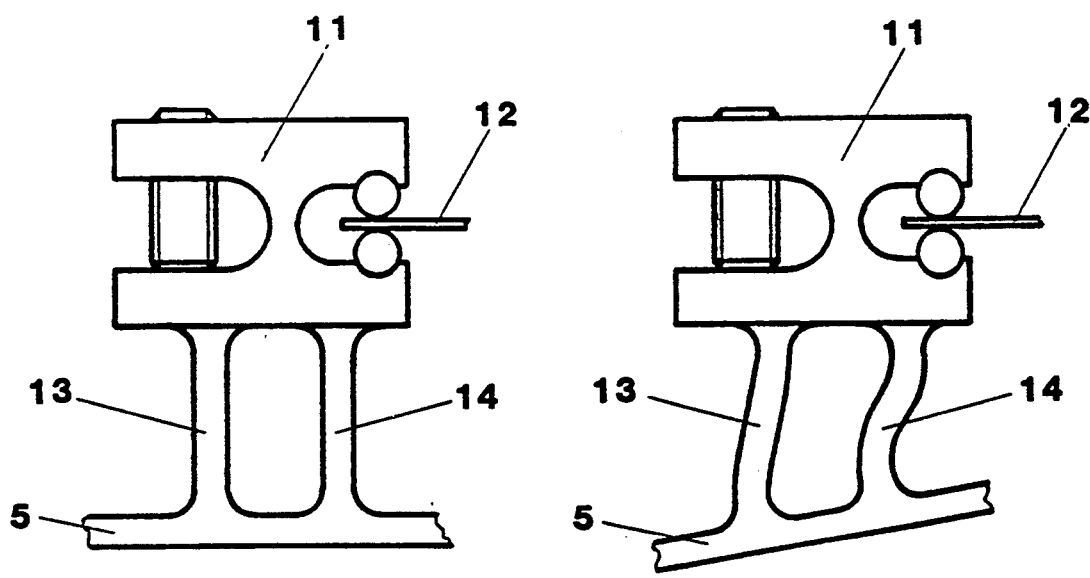
FIG. 2a is a fragmentary side view of a dynamometer constructed in accordance with the teachings of the present invention.
FIG. 2b illustrates the dynamometer of FIG. 2a under load.

Referring not to FIG. 2a, a dynamometer constructed in accordance with the teachings of the present invention may now be seen. In contrast with known dynamometer such as the dynamometer illustrated in FIG. 1, the present invention is of a dynamometer in which the laterally oscillating wire 12 is clamped between a pair of wire clamping heads mounted on an improved strut support means. More specifically, wire clamping head 11 is mounted on a pair of struts 13, 14 which are parallel to each other. Each pair of parallel struts 13, 14 are positioned in approximately the center of thinner plate springs 4, 5, respectively.

In FIG. 2a, only the initial load has an effect in imparting the necessary initial stess to wire 12. As previously discussed, force to be measured by the dynamometer are introduced by post 7 or another alternate force introduction means known in the art such as a tension wire or other apparatus. As may be seen in FIG. 2b, when a force to be measured by the dynamometer is exerted on post 7, the exerted force twists thinner plate spring 5 in a counterclockwise direction. In addition to flexural stress, the tensile force of wire 12 exerts an elevated tensile force on strut 13 and a compressive force on strut 14. By appropriately sizing struts 13 and 14 relative to each other, wire clamping head 11 will only shift in a parallel direction to the head.

Figures 3A, 3B:
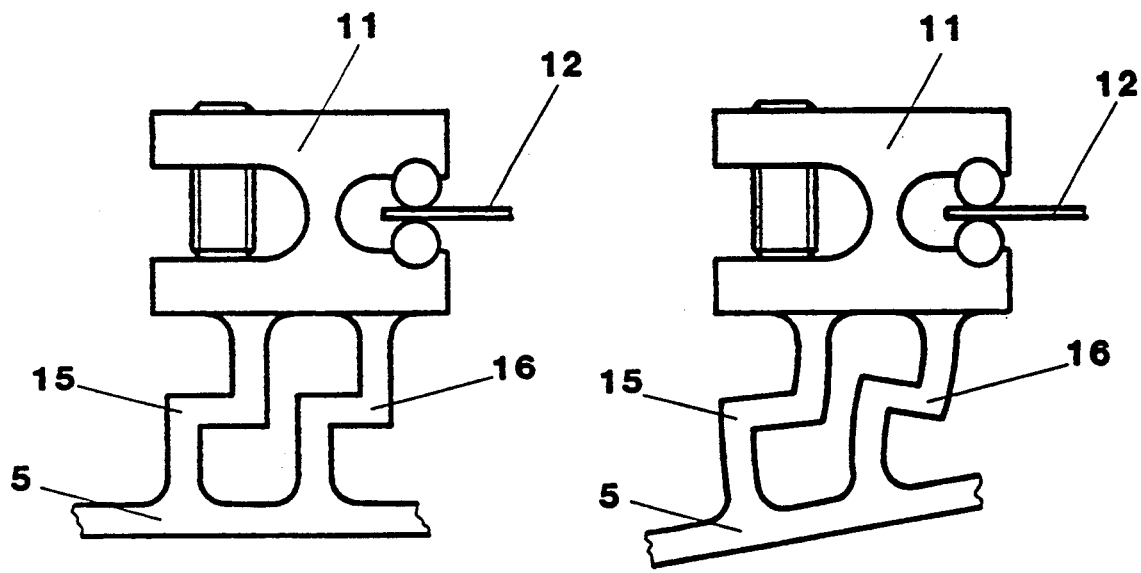
FIG. 3a is a fragmentary side view of a second embodiment of the dynamometer constructed in accordance with the teachings of the present invention.
FIG. 3b illustrates the dynamometer of FIG. 3a under load.

Referring next to FIG. 3a, a second embodiment of the dynamometer constructed in accordance with the teachings of the present invention may now be seen. Here, the laterally oscillating wire 12 is clamped between wire clamping heads 11 whereby each wire clamping head 11 is mounted on the plate spring 5 by a pair of offset struts 15, 16. If desired, the offset strut 15 may be constructed with a elasticity different than offset strut 16 by appropriately sizing the two offset struts relative to each other, again so that wire clamping head 11 will sift only in a direction parallel to the head. Such a result is made possible by appropriate spring deflection of struts 15, 16. In FIG. 3b, the dynamometer of FIG. 3a may be seen when a force to be measured is exerted on the dynamometer.

In yet another embodiment of the invention not illustrated in FIGS. 3a-b, the direction of the offset of strut 16 is reversed. In this embodiment, the offset of strut 16 points toward the right, away from strut 15. In this embodiment, it is recommended that strut 16 is attached to plate spring 5 to the right of the point of attachment illustrated in FIG. 3a whereas the point of attachment of strut 16 to the wire clamping head 11 may remain at the point illustrated in FIG. 3a. Finally, in accordance with the further teaching of the invention, if the offset of strut 15 is changed to the other side, the points of attachment of the struts 15, 16 to the plate spring 5 should lie closer to each other than the points of attachment of the struts 15, 16 to wire clamping head 11.

Figures 4A, 4B:
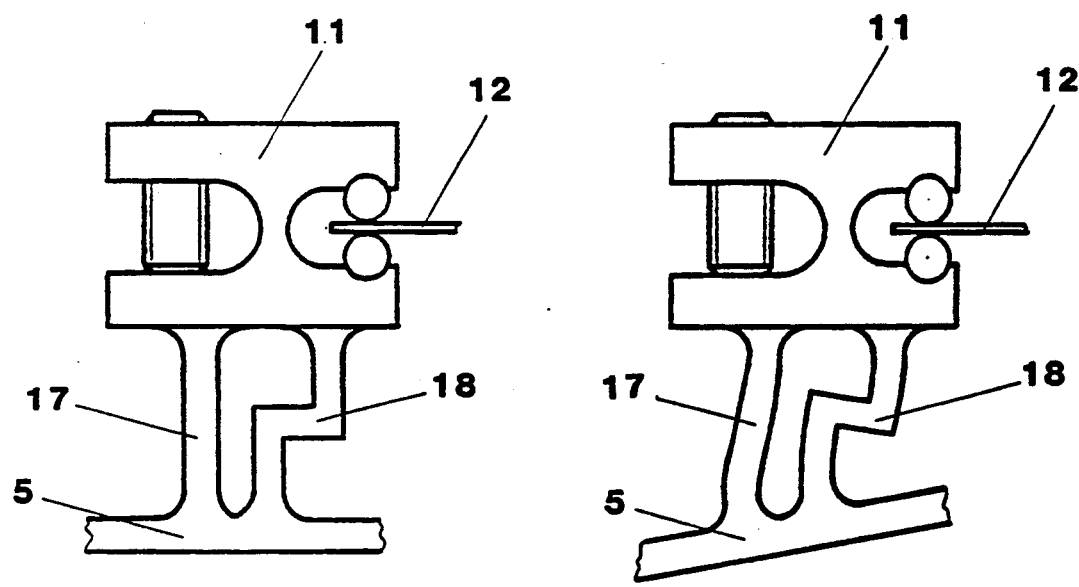
FIG. 4a is a fragmentary side view of a third embodiment of the dynamometer constructed in accordance with the teachings of the present invention.
FIG. 4b illustrates the dynamometer of FIG. 4a under load.

Referring next to FIG. 4a, a third embodiment of the dynamometer constructed in accordance with the teachings of the present invention may now be seen. In this embodiment, wire clamping head 11 is held by a first, straight strut 17 and a second, offset strut 18. Here, the flexural rigidity of struts 17, 18 can be varied within a wide range relative to each other by varying the respective dimensions of struts 17, 18. In FIG. 4b, th dynamometer of FIG. 4a may be seen when a force to be measured is exerted on the dynamometer.

In another embodiment of the invention not shown in the drawings, the offset of strut 18 is arranged on the opposite side, i.e. the offset strut 18 points away from straight strut 17 rather than towards straight strut 17, so that the points of attachment of the struts 17, 18 to thinner plate spring 5 lie further from each other than the points of attachment of the struts 17, 18 to wire clamping head 11. In yet another embodiment not shown in the drawings, the straight strut 17 and the offset strut 18 are reversed in position. In this embodiment, the straight strut 17 stands to the right and the offset strut 18 stands to the left.

Referring next to FIG. 5a, yet another dynamometer constructed in accordance with the teachings of the present invention may now be seen. In this embodiment, a pair of elongated struts 19, 20 are formed together with plate spring 5 and wire clamping head 11 to define a trapezoid therebetween. As shown in FIGS. 5a-b, the trapezoid defined by a plate spring 5, struts 19, 20 and wire clamping head 11 may be symmetrical. However, one of the struts 19, 20 may be longer than the other strut 20, 19, thereby defining an asymmetrical trapeziod while still preserving the parallelism of wire clamping head 11 and plate spring 5. Again, the flexural rigidity of strut 19 relative to strut 20 may be varied by selecting the relative thickness of struts 19 and 20. As a result, when a force to be measured is introduced, the wire clamping head 11 will shift only in a direction parallel to the head. In FIG. 5b, the dynamometer of FIG. 5a may be seen when a force to be measured is exerted on the dynamometer.

In an embodiment not shown in FIGS. 5a-b, the base of the trapezoid, whether symmetrical or asymmetrical, is defined by the wire clamping head 11 and the shorter side of the trapezoid is defined by plate spring 5.

Referring next to FIG. 6a, yet another embodiment of a dynamometer constructed in accordance with the teachings of the present invention may now be seen. Similar to the embodiment of the invention described and illustrated with respect to FIG. 2, this embodiment of the invention also includes a pair of straight, parallel struts 21, 22. In this embodiment, however, the struts 21, 22 are each provided with a pair of opposing offset notches 23 and 24 or 25 and 26, respectively. Again, any ratio within a wide limit of the flexural rigidity of strut 21 relative to strut 22 may be selected by varying the material thickness of struts 21, 22, the depth and width of notches 23, 24, or 25, 26 and the distance between the notches on the strut 21, 22, therebetween. Referring now to FIG. 6b, a front view of the dynamometer from the direction of laterally oscillating wire 12 of FIG. 6a may now be seen. From this view, only strut 22 (with notches 23, 24) may be seen.

In another embodiment of the invention not seen in FIGS. 3a-b or 6a-b, only a single 21, 22 would be provided with notches. In this embodiment, either strut 21 would include notches 25, 26 or strut 22 would include notches 23, 24. In accordance with yet another embodiment of the invention, notches 23, 24 could be provided on straight strut 17 illustrated in FIGS. 4a-b. Finally, in accordance with still yet another embodiment of the invention, notches 23, 24 and/or notches 25, 26 would be provided on either one or both of struts 19 and 20, respectively, which, together with thinner plate spring 5 and wire clamping head 11 define the trapezoid illustrated in FIGS. 5a-b.

While the configuration of thinner plate spring 5, wire clamping head 11 and the various types of supporting struts therebetween has been described in detail, it should be clearly understood that it is fully contemplated that thinner plate spring 4, wire clamping head 10 and the supporting struts therebetween be similarly configured. Accordingly, it is contemplated that, in constructing a dynamometer in accordance with the teachings of the present invention, the support between plate spring 4 and wire clamping head 10 should be similar to that between plate spring 5 and wire clamping head 11. More specifically, the supporting struts between the plate spring 4 and wire clamping head 10 would be the mirror image to struts 13 through 22 herein described.

Thus, there has been described and illustrated herein a balance and an elastic dynamometer which reduces the input force exerted thereon. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed:

1. A balance and an elastic, force reducing dynamometer comprising:
    a frame;
    a central block portion;
    means for applying a force to be measured by said dynamometer to said central block portion;
    a first pair of plate springs having a first rigidity;
    a second pair of plate springs having a second rigidity different from said first rigidity;
    a first wire clamp mounted approximately in the center of a first one of said second pair of plate springs
    a second wire clamp mounted approximately in the center of a second one of said second pair of plate springs;
    a laterally oscillating wire clamped between said first and second wire clamps;
    a first pair of struts for mounting said first wire clamp on said first one of said second pair of plate springs; and
    a second pair of struts for mounting said second wire clamp on said second one of said second pair of plate springs.

2. An apparatus according to claim 1 wherein said first pair of struts further comprise a pair of straight struts which are parallel to each other.

3. An apparatus according to claim 2 wherein said second pair of struts further comprises a pair of straight struts which are parallel to each other.

4. An apparatus according to claim 3 wherein each of said straight struts further includes a pair of opposing, offset notches.

5. An apparatus according to claim 3 wherein one of said first pair of straight struts and one of said second pair of straight struts is provided with a pair of opposing, offset notches.

6. An apparatus according to claim 1 wherein each of said first and second pairs of struts further comprise a straight and an offset strut.

7. An apparatus according to claim 6 wherein said straight strut of said first pair of struts and said straight strut of said second pair of struts are each provided with two opposing, offset notches.

8. An apparatus according to claim 1 wherein each of said first and second pairs of struts further comprise a pair of offset struts.

9. An apparatus according to claim 1 wherein each of said first and second pairs of struts further comprise a pair of straight struts, and wherein said first one of said second pair of plate springs, said first wire clamp and said first pair of straight struts define a first trapezoid and said second one of said second pair of plate springs, said second wire clamp and said second pair of straight struts define a second trapezoid.

10. An apparatus according to claim 9 wherein each of said first and second pairs of straight struts are of equal length, said first and second trapezoids defined thereby each being symmetrical.

11. An apparatus according to claim 9 wherein a first one of said first pair of struts has a length different from a second one of said first pair of struts and a first one of said second pair of struts has a length different from a second one of said second pair of struts, said first and second trapezoids defined thereby being asymmetrical.

12. An apparatus according to claim 9 wherein at least one of said first pair of struts and at least one of said second pair of struts are each provided with two opposing, offset notches.

* * * * *